(12) United States Patent  
Govindaswamy et al.

(10) Patent No.: US 7,388,993 B2  
(45) Date of Patent: *Jun. 17, 2008

(54) PARAMETER SELECTION IN DATA COMPRESSION AND DECOMPRESSION

(75) Inventors: Senthil Govindaswamy, San Diego, CA (US); Judith LaRocca, Lexington, MA (US); Jeff Levin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/252,436

(22) Filed: Oct. 17, 2005

(65) Prior Publication Data

US 2006/0034532 A1 Feb. 16, 2006

Related U.S. Application Data

(63) Continuation of application No. 10/630,511, filed on Jul. 29, 2003, now Pat. No. 6,975,773.

(60) Provisional application No. 60/399,838, filed on Jul. 30, 2002.

(51) Int. Cl.  
*G06K 9/46* (2006.01)

(52) U.S. Cl. .................... 382/240; 382/246

(58) Field of Classification Search ............... 382/293, 382/240, 246  
See application file for complete search history.

(56) References Cited

U.S. PATENT DOCUMENTS 5,107,345 A * 4/1992 Lee ........................... 382/250  
5,241,395 A * 8/1993 Chen ..................... 358/426.14  
5,452,104 A * 9/1995 Lee ........................ 358/426.14  
5,764,807 A * 6/1998 Pearlman et al. ........... 382/240

FOREIGN PATENT DOCUMENTS

WO     WO 0135673 A1 * 5/2001  
WO     WO 0141443 A1 * 6/2001  
WO     WO 0156298 A1 * 8/2001

* cited by examiner

*Primary Examiner*—Wenpeng Chen  
(74) *Attorney, Agent, or Firm*—Matthew J. Evans; Milan Patel; Thomas R. Rouse (57) ABSTRACT

Apparatus and method for selecting an appropriate parameter at decompression are disclosed. In particular, when adaptive block size discrete cosine transform compression is used to compress data, different combinations of sub-blocks can be generated. To decompress the different combinations of sub-blocks, the appropriate parameter is selected based on block size assignment information and the address of data in the data block.

12 Claims, 11 Drawing Sheets

FIRST ORDERING
FIG. 3A

SECOND ORDERING
FIG. 3B

THIRD ORDERING
FIG. 3C

FOURTH ORDERING
FIG. 3D

PQR = 0000 0100 1
FIG. 5B

PQR = 0000 1
FIG. 5D

PQR = 0
FIG. 5A

PQR = 0110 0000 0101 1
FIG. 5C

LOCATION = $Y_2$ & $X_2$
FIG. 11B

LOCATION = $Y_3$ & $X_3$
FIG. 11A

PARAMETER SELECTION IN DATA COMPRESSION AND DECOMPRESSION

CLAIM OF PRIORITY UNDER 35 U.S.C. §120

The present Application for Patent is a continuation of, and claims the benefit of priority from, Ser. No. 10/630,511, now U.S. Pat. No. 6,975,773 entitled "PARAMETER SELECTION TN DATA COMPRESSION AND DECOMPRESSION" filed Jul. 29, 2003 and issued on Dec. 13, 2005, which claims the benefit of priority from U.S. Provisional Patent Application No. 60/399,838 entitled "Parameter Selection in Data Compression and Decompression" and filed on Jul. 30, 2002, both of which assigned to the assignee hereof and hereby expressly incorporated by reference herein.

BACKGROUND OF THE INVENTION

1. Field of Invention

The invention generally relates to data compression, and more particularly to decompression of data compressed using adaptive discrete cosine transform process.

2. Description of the Related Art

Compression is a key factor of multimedia. An effective digital compression can reduce the cost as well as increase the quality of video displayed over any digital communication channel. One application for compression techniques is the motion picture industry.

For several decades, the motion picture industry has depended on the duplication, distribution, and projection of celluloid film for delivering programming material to geographically diverse theaters around the country and the world. To a large extent, the methods and mechanisms for the distribution of film material have remained relatively unchanged for decades. Generally, the current film duplication and distribution process involves generating a master film copy from an exceptional quality camera negative, producing a distribution negative from the master film copy, and producing distribution prints from the distribution negative. Depending on the size of the release or number of copies desired for distributing the film, there may be more intermediate steps or multiple copies produced at each stage. The distribution prints (known as "positives") are then distributed by physical means to various theaters and displayed using a film projector.

Although the distribution process above works, there are inherent limitations. Due to the use of celluloid material for the film and the bandwidth limitations of the film media, there are restrictions on the ability to provide high fidelity multichannel audio programming. Then, there is the high expense of making a large number of film duplicates, which can cost several hundreds of dollars for each copy of each feature length film. There is also the expense, complexity, and delay associated with physically distributing large canisters of celluloid film to a large and growing number of theater locations.

Accordingly, new and emerging technologies are being developed to provide alternative approaches to the ongoing film distribution problems. One such method is the use of satellite transmission. However, in order to transmit a high quality audio/video (AV) signal in "real-time," the data rate requirement (in bits per second) is on the order of 1.5 billion bits per second. This high data rate requires the capacity equivalent of an entire satellite to transmit even a single program, which is prohibitively expensive. Therefore, satellite transmissions are not yet commercially viable for the distribution of high quality AV material.

Advances in digital technology have also led to a distribution concept whereby programming material is electronically stored in a digitized format. The digitized images may be distributed on various magnetic media or compact optical discs, or transmitted over wired, fiber optic, wireless, or satellite communication systems. These storage mediums typically have storage capacities ranging from about 4.5 gigabytes (GB) to about 18 GB. However, an average two hour movie having an average image compressed bit rate of about 40 Mbps for the image track and about eight Mbps for audio and control information, requires approximately 45 GB of storage space. Thus, even if a high storage capacity DVD-ROM disk is implemented, a two-hour movie requires use of multiple DVD-ROM disks for adequate capacity.

To reduce the data rate requirement for the storage of high quality electronic images, compression algorithms are being developed. One digital dynamic image compression technique capable of offering significant compression while preserving the quality of image signals utilizes adaptively sized blocks and sub-blocks of encoded discrete cosine transform (DCT) coefficient data. This technique will hereinafter be referred to as the adaptive block size discrete cosine transform (ABSDCT) method. The adaptive block sizes are chosen to exploit redundancy that exists for information within a frame of image data. The technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Discrete Quadtree Transform technique is discussed in U.S. Pat No. 5,452,104, entitled "Adaptive Block Size Image Compression Method And System," also assigned to the assignee of the present invention and incorporated by reference herein. The systems disclosed in these patents utilize intraframe encoding, wherein each frame of an image sequence is encoded without regard to the content of any other frame.

Generally, compression of data streams comprises quantization after discrete cosine transform. Moreover, different quantization parameters are often used for different data block sizes. Similarly, decompression of compressed data streams comprises inverse quantization and different quantization parameters are used for different data block sizes.

In a typical discrete cosine transform, the size of each data block is fixed and the same quantization parameter may be used for quantization and inverse quantization of each data block. However, if ABSDCT is implemented, data blocks may be divided into different combinations of sub-blocks for the discrete cosine transform. Accordingly, depending on how a data block is divided, different quantization parameters are used for quantization of each data block. Similarly, depending on how a data block is divided, different quantization parameters are used for inverse quantization of each data block. Therefore, in order to perform inverse quantization during decompression, the appropriate quantization parameters need to be known for each data block being processed.

SUMMARY OF THE INVENTION

Embodiments disclosed herein address the above stated needs by providing a method for security in a data processing system. More particularly, embodiments allow selection of the appropriate quantization parameter during decompression of data compressed using the adaptive block size discrete cosine transform technique. The selection is based on the pixel position of data and the block size assignment.

In one embodiment, an apparatus and method comprise means for variable length decoding compressed information to generate a variable length decoded data block(s). The apparatus and method also comprise means for inverse quantizing the variable length decoded data block using a quantization parameter selected based on block size assignment information and address of data within the data block. The apparatus and method may further comprise means for inverse adaptive block size discrete cosine transforming the inverse quantized data block to recover original data. Here, the quantization parameter may be selected by the means for inverse quantizing the variable length decoded data block. Alternatively, the apparatus and method may further comprise means for selecting the quantization parameter. Moreover, the apparatus and method may further comprise a means for decoding the address of data into Y and X indices based on a Y and X index system.

In another embodiment, instructions are loaded on a machine readable medium, wherein a first set of instructions is variable length decode compressed information to generate a variable length decoded data block(s). A second set of instructions is to select a quantization parameter based on block size assignment information and address of data within the data block. A third set of instructions is to inverse quantize the variable length decoded data block using the selected quantization parameter.

In still another embodiment, an apparatus comprises means for displaying decompressed image information, and means for playing decompressed audio information. The apparatus also comprises a means for decoding compressed information, wherein the means for decoding comprises image decompressing means and an audio decompressing means. The image decompressing means is configured to decompress compressed image information into the decompressed image information based on block size assignment information and address of data within a data block. The audio decompressing means is configured to decompress compressed audio information into the decompressed audio information.

In a further embodiment, an apparatus and method comprise means for decoding an address of a data block into Y and X indices based on a Y and X index system. The apparatus and method also comprise means for receiving block size assignment information. The apparatus and method further comprises means for selecting an appropriate quantization parameter based on the block size assignment information and the Y and X indices. Here, the data block may be a 16×16 data block, wherein the block size assignment information comprises a first bit indicating whether the 16×16 data block is divided into 8×8 sub-blocks; second bits if the first bit indicates that the 16×16 is divided into 8×8 sub-blocks, each second bit indicating whether a corresponding 8×8 sub-block is divided into 4×4 sub-blocks; and third bits if at least one second bit indicates that the corresponding 8×8 sub-block is divided into 4×4 sub-blocks, each third bit indicating whether a corresponding 4×4 sub-block is divided into 2×2 sub-blocks.

BRIEF DESCRIPTION OF THE DRAWINGS

The invention will be described in detail with reference to the following drawings in which like reference numerals refer to like elements, wherein.

DESCRIPTION OF THE INVENTION

Generally, the apparatus and method allows selection of the appropriate quantization parameters during decompression based on pixel positions in a data block. In particular, when the adaptive block size discrete cosine transform (ABSDCT) compression is implemented, the appropriate Q_step value is selected for inverse quantization of the different combinations of sub-blocks. Also, if frequency weighting is used, the appropriate frequency weight mask (FWM) table is also selected for inverse quantization.

Technologies such as the ABSDCT compression technique offer the possibility of a "digital cinema" system. Generally defined, digital cinema refers to the electronic distribution and display of high quality film programming which has been converted to a digital electronic representation for storage, transmission, and display purposes. A digital cinema system would overcome many of the limitations of the current film distribution process. A digital system would not be subject to the quality degradation over time experienced by celluloid film. Further, a digital system may eliminate the theft and illegal duplication of films by allowing implementation of security measures within the digital system itself. Moreover, distribution of film information using a digital electronic format actually increases the potential for rapid, low-cost duplication without quality degradation.

Digital cinema may include the electronic generation, compression, encryption, and storage of audio/visual programming, such as motion pictures in theater systems, theaters, theater complexes, and/or presentation systems. Accordingly, the invention is applicable to the presentation of image and audio information in a variety of locations such as a theatre or theatre complex, outdoor amphitheaters, drive-in complexes, civic auditoriums, schools and specialty restaurants. For purposes of the explanation, the invention will be described with reference to a theatre or theatre complex. However, those skilled in the art will readily understand that the invention may be applied to other types of locations, systems and fields.

Also, as disclosed herein, the term "program" refers to one or more films for display in cinemas, televisions, and/or other presentation systems and/or locations. The term "film" refers to various moving picture including, but not limited to, a full or portion of motion picture, a video clip, a commercial, a drama or a combination thereof. Image portion of films may consist of single frames (i.e., still images), a sequence of single frame still images, or motion image sequences of short or long duration. The term "storage medium" represents one or more devices for storing data, including buffers, read only memory (ROM), random access memory (RAM), magnetic disk storage mediums, optical storage mediums, flash memory devices, digital versatile disk (DVD), removable hard drive (RHD) and/or other machine readable mediums for storing information. The term "machine readable medium" includes, but is not limited to portable or fixed storage devices, optical storage devices, wireless channels and various other devices capable of storing, containing or carrying codes and/or data. The term "encryption" refers to various means of processing digital data streams of various sources using any of a number of cryptographic techniques to scramble, cover, or directly encrypt digital streams using sequences generated using secret digital values ("keys") in such a way that it is very difficult to recover the original data sequence without knowledge of the secret key values.

Figure 1:
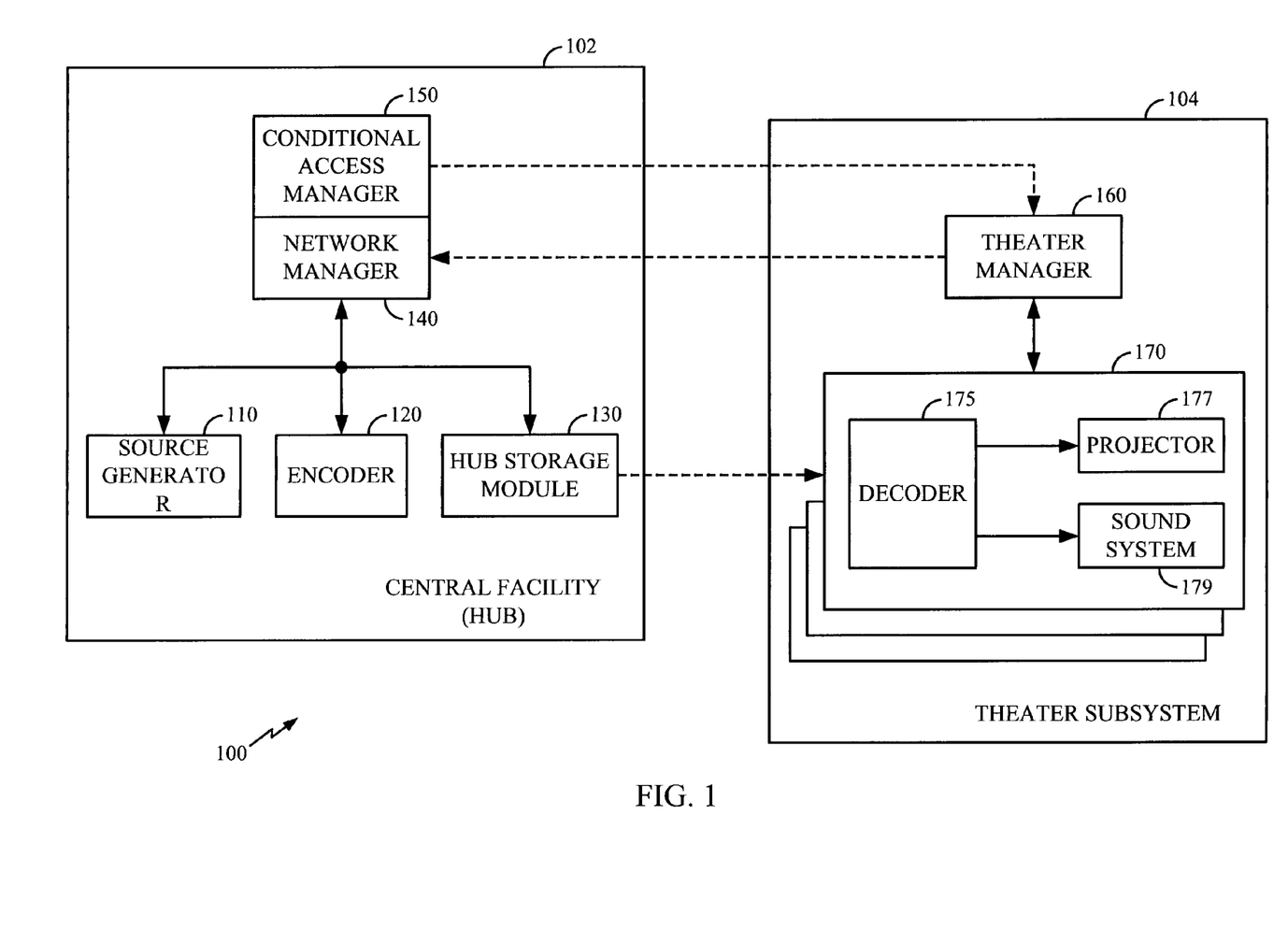
FIG. 1 shows one embodiment of a digital cinema system.

One embodiment of a digital cinema system 100 is illustrated in FIG. 1. The digital cinema system 100 comprises two main systems: at least one central facility or hub 102 and at least one presentation or theater subsystem 104. The hub 102 and the theater subsystem 104 may be implemented by a design similar to that of U.S. Pat. No. 6,985,589, which issued on Jan. 10, 2006, and U.S. Patent Application Publication No. 2002-0056081, now abandoned, both of which are assigned to the same assignee as the present invention, and are both fully incorporated herein by reference.

Generally, the hub 102 includes a source generator 110 to receive and convert program material into a digital version of the program. The digital information is compressed using a preselected format or process by an encoder 120, and stored on a storage medium by a hub storage module 130. Here, the program material includes one or both image information and audio information. Accordingly, the digital information may include one or both digital image information and audio information. A network manager 140 monitors and sends control information to the source generator 110, the encoder 120, and the hub storage module 130. The digital information may also be encrypted by the encoder 120. In such case, the hub 102 may optionally include a conditional access manager 150 to provide specific electronic keying information such that only specific locations, for example theatres, are authorized to show specific programs and/or at specific times.

It is to be noted that, although the source generator 110 and the encoder 120 are parts of the hub 102 as shown in FIG. 1, either or both the source generator 110 and the encoder 120 can be located in separate facilities such as a film or television production studio. Also, some data may not require conversion by the source generator 110. For example, digital information may be provided to the encoder 120 through a digital camera or other digital information generation device.

The theatre subsystem 104 may include a theatre manager 160 that controls one or more auditorium modules 170. Each auditorium module 170 comprises a decoder 175, a projector 177 and a sound system 179. Under the control of the theatre manager 160, compressed digital information is received from the hub 102, decoded by the decoder 175, decrypted (if necessary) and played by the auditorium modules 170 through the projector 177 and sound system 179. The compressed information may be received through a storage medium or may be transmitted in real-time, as desired. Also, the compressed information may be prepared as a selected sequence, size and data rate prior to being decoded.

Typically, the data stream input to the encoder 120 is composed of image frames. An image frame can generally be divided into slices, a slice can be divided into data blocks, and a data block can be divided into pixels which are the smallest units of an image. Each image frame includes an integer number of slices and each image slice typically represents the image information for a set of 16 consecutive scan lines. In such case, each data block corresponds to a block of 16×16 pixels across the image of the frame. Also, a frame may be separated into even and odd slices, thereby forming an even half frame and an odd an half frame. In one embodiment, half frames are the fundamental packets of compressed data information that are processed by a decoder. Moreover, an image pixel can be commonly represented in the Red, Green and Blue (RGB) color component system. However, because the human eye is more sensitive to changes in luminance and less sensitive to changes in chrominance, the YCbCr color space is typically used in video compression to represent image pixels. The YCbCr color space is a linear transformation of the RGB components, where Y is the chrominance component, and Cb and Cr are the color components. If a frame is separated into even/odd frames, an image frame would be made up of three even half frames and three odd half frames corresponding to the components Y, Cb and Cr.

In the description above, a slice can represent a set of consecutive scan lines other than 16 consecutive scan lines. Also, a different color space with the same or different number of color components may be used to represent an image pixel. However, a block size of 16×16 pixels and the YCbCr color space are used for purposes of explanation.

Figure 2:
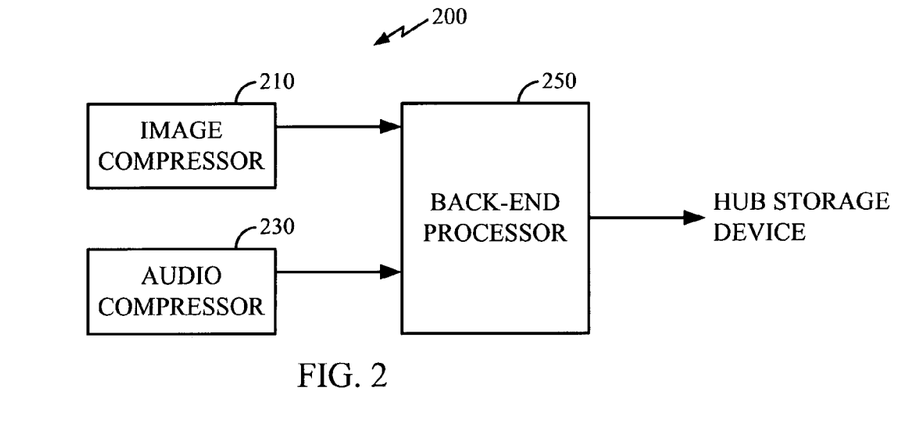
FIG. 2 shows one embodiment of an encoder.
Figure 3A:
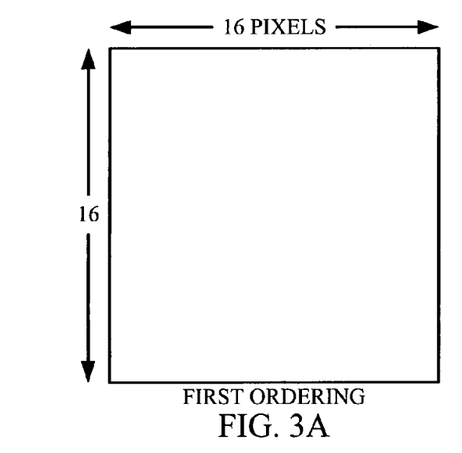
FIGS. 3A to 3D illustrate one embodiment of block and sub-block divisions for a 16×16 block image.
Figure 3B:
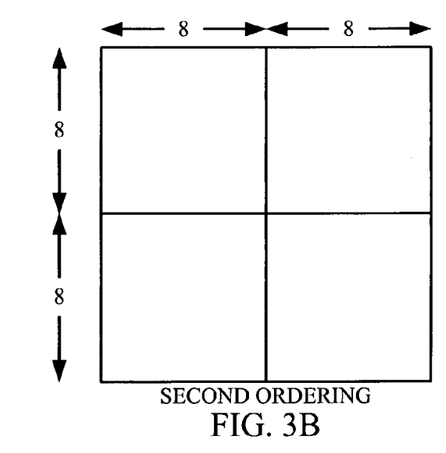
Figure 3C:
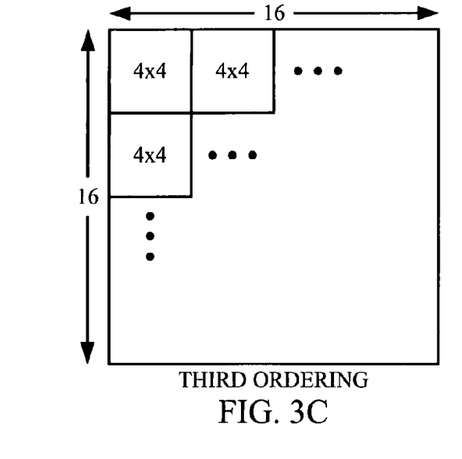
Figure 3D:
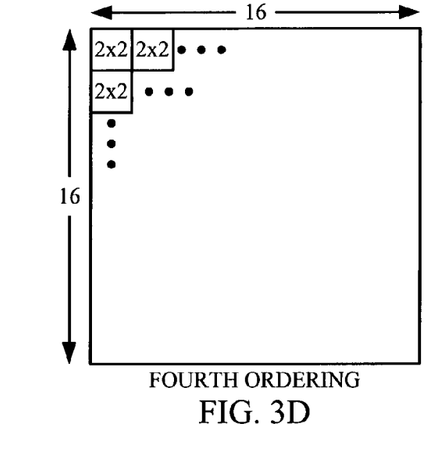

FIG. 2 shows one embodiment of an encoder 200 comprising an image compressor 210, an audio compressor 230 and a back-end processor 250. When the encoder 200 receives digital information, the digital image and audio information may be stored in frame buffers (not shown) before further processing. The image compressor 210 compresses the digital image information using any number of compression techniques. In one embodiment, the image compressor 210 compresses the digital image information using the ABSDCT technique described in U.S. Pat. Nos. 5,021,891, 5,107,345, and 5,452,104.

Generally, each of the luminance and chrominance components is passed to a block interleaver (not shown). In one embodiment, as shown in FIGS. 3A to 3D, a 16×16 block is presented to the block interleaver, which orders the image samples within the 16×16 blocks to produce blocks and composite sub-blocks of data for DCT analysis. One 16×16 DCT is applied to a first ordering, four 8×8 DCTs are applied to a second ordering, 16 4×4 DCTs are applied to a third ordering, and 64 2×2 DCTs are applied to a fourth ordering. The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block. Then, the block or the combination of sub-blocks that requires the least number of bits to encode is chosen to represent the image segment. For example, two 8×8 sub-blocks, six 4×4 sub-blocks, and eight 2×2 sub-blocks may be chosen to represent the image segment. The chosen block or combination of sub-blocks is then properly arranged in order.

Figure 4A:
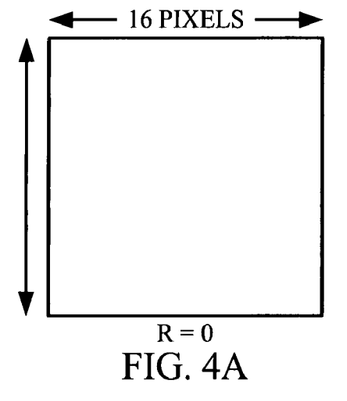
FIGS. 4A and 4B illustrate one embodiment of block size assignment data.
Figure 4B:
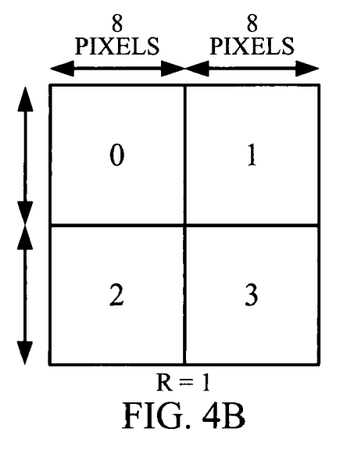

In one embodiment, the image compressor 210 comprises an ABSDCT module 212 that analyzes the transformed coefficients and selects the block or the combination of sub-blocks to represent the image segment. The ABSDCT module 212 also generates block size assignment information that represents the block size assignment within an n×n block. For the 16×16 data block, the ABSDCT module 212 generates data known as PQR information that represents the block size assignment within the 16×16 block. The PQR information is a variable bit width data that describes to what extent a 16×16 block is subdivided. The R-bit of the PQR field represents whether the 16×16 block is subdivided into four 8×8 blocks. As shown in FIG. 4A, if the R bit is '0', the block remains whole. In this case no further PQR information is needed and the PQR field is only 1 bit long. If the R bit is '1', then the 16×16 block is subdivided into four 8×8 blocks as shown in FIG. 4B, and at least four additional bits will exist in the PQR field.

Figure 5A:
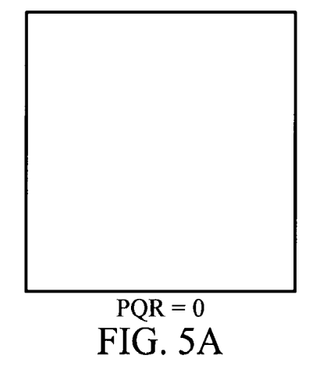
FIGS. 5A to 5D show examples of the block size assignment data.
Figure 5B:
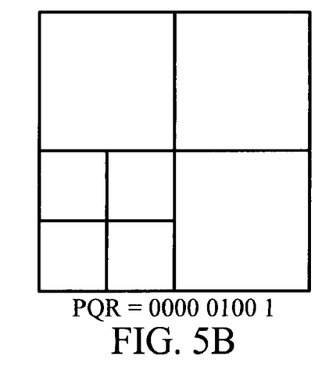
Figure 5C:
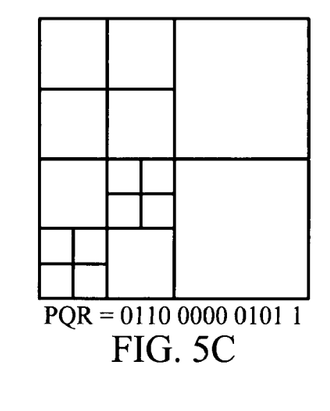
Figure 5D:
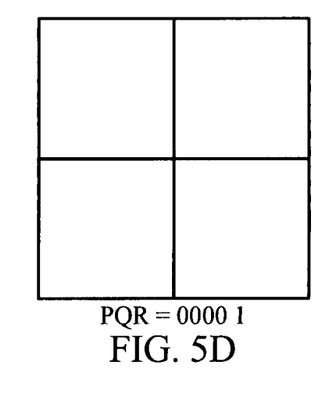

The additional four bits are referred to as 'Q' information. Each bit of Q denotes a subdivision of an 8×8 block into four 4×4 blocks. For each bit of Q that is set, four more bits of 'P' are present to indicate if any of the 4×4 blocks are subdivided into 2×2. Accordingly, the length of PQR data can be 1 to 21 bits long, depending on the block size assignment within the 16×16 block. If every 8×8 block is subdivided into 2×2 blocks, then the PQR information will be 21 bits in length. FIG. 5A-D shows some examples of the 16×16 blocks with corresponding PQR data. In FIG. 5A, PQR=0 indicates that the 16×16 block is not subdivided. In FIG. 5B, PQR=0000 0100 1 indicates that the 16×16 block is subdivided into four 8×8 blocks and one of the 8×8 block is subdivided into four 4×4 blocks. In FIG. 5C, PQR=0110 0000 0101 1 indicates that the 16×16 block is subdivided into four 8×8 blocks, one of which is subdivided into four 4×4 blocks and two of 4×4 blocks are divided into four 2×2 blocks. In FIG. 5D, PQR=0000 1 indicates that the 16×16 block is subdivided into four 8×8 blocks.

The image compressor 210 may further comprise an index module that determines an index system to represent the positions of image pixels in an n×n block. Some embodiments may provide a plurality of index systems, one of which is selected by the index module depending upon the compression technique. In such case, the encoder 120 and decoder 175 stores the plurality of index systems and the index module would transmit a signal to indicate the selected index system. In other embodiments, one fixed index system may be used to represent the image pixel locations.

Figure 6A:
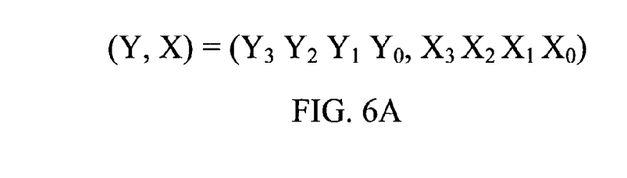
FIGS. 6A to 6C illustrate one embodiment of the Y-X index system to represent positions of image pixels.
Figure 6B:
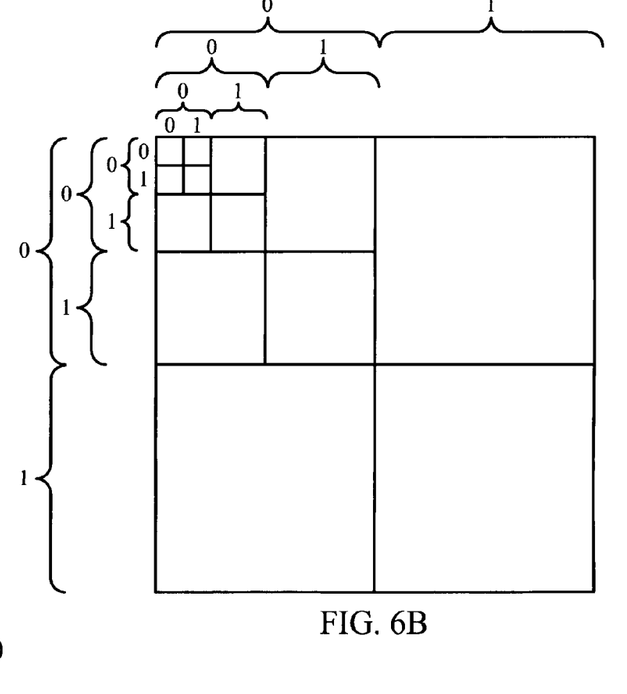
Figure 6C:
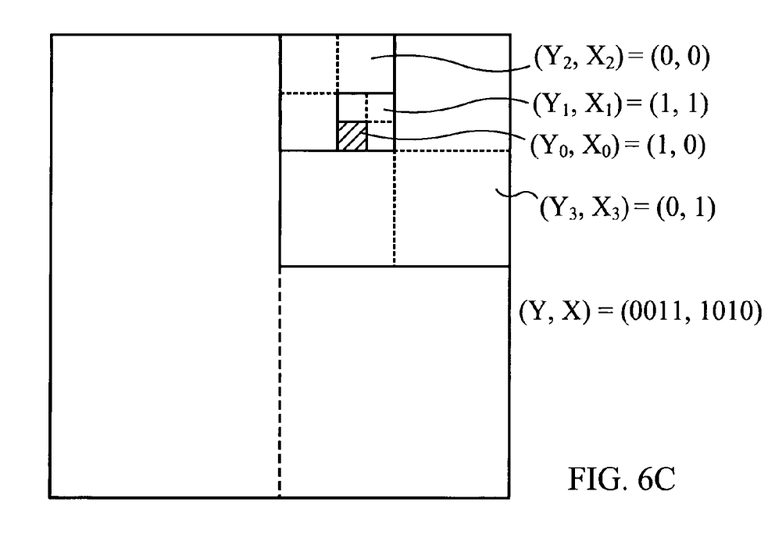

FIG. 6A shows one embodiment of a Y-X index system that represents positions of image pixels in a 16×16 block with four orderings as described above. As shown in FIG. 6B, each Y, X set of the four bit Y and X indices determines a quadrant of a corresponding block or sub-block within the 16×16 block. For example, FIG. 6C shows an image pixel position with the corresponding Y, X indices. Here, the $Y_3$ and $X_3$ bits determine the 8×8 block quadrant, the $Y_2$ and $X_2$ bits determine the 4×4 block quadrant, the $Y_1$ and $X_1$ bits determine the 2×2 quadrant, and the $Y_0$ and $X_0$ bits determine the image pixel location within the 2×2 sub-block.

Figure 7:
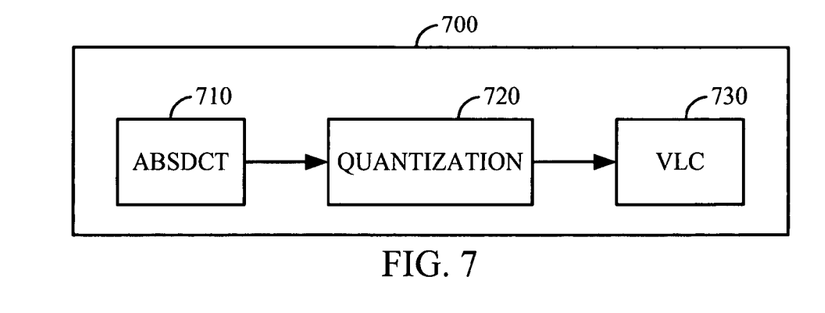
FIG. 7 shows one embodiment of an image compressor.

FIG. 7 shows one embodiment of an image compressor 300 comprising an ABSDCT module 710, a quantization module 720 and a variable length coding (VLC) module 730. The ABSDCT module 710 converts the digital image information from spatial to frequency domain using the ABSDCT technique and generates DCT coefficients with corresponding block size assignment information, such as the PQR information for the 16×16 data block. The quantization module 720 quantizes the DCT coefficients and the VLC 730 compresses the quantized DCT coefficients using a variable length coding technique. The image compressor 300 may further comprise an index module that generates signals that indicate the index system used during the compression.

The quantization module 720 quantizes the DCT coefficients using quantization steps (Q_step) based on the block size assignment and position as determined by the index system. The Q-step may be used as a programmable quantization level and may be maintained by software stored in a storage medium (not shown). In one embodiment, there are different Q_step values for each color component (Y, Cb, Cr) and a different set of Q_step values for each block or sub-block size (16×16, 8×8, 4×4, and 2×2). Furthermore, in one embodiment, the DCT coefficients can be quantized using weighting functions such as frequency weight masks (FWMs) optimized for the human eye. If used in combination with ABSDCT, there would be a different FWM table for each block or sub-block size (16×16, 8×8, 4×4, and 2×2). There would also be at least three different sets of FWM tables, one for each component Y, Cb and Cr.

In one embodiment, the quantization is implemented by two multipliers. The DCT coefficient may be multiplied by the Q_step based on the block or sub-block size and position. The result is then multiplied by a frequency weight at a corresponding pixel position from a FWM table based on the block size assignment.

In variable length coding the quantized DCT coefficients, the VLC 730 may include a Huffman engine for Huffman coding the non-zero AC coefficient values along with the run length of zeros. Namely, a Huffman code represents the number of zeros preceding a non-zero AC coefficient and the size (minimum number bits required for representation) of that non-zero AC coefficient. Accordingly, the DCT coefficients are run-length coded to generate the different pairs of run lengths of zeros and corresponding size of the subsequent non-zero AC coefficient. Here, zigzag scanning or other scanning patterns can be used to increase the runs of zeros. Tables are then used to assign codes to the different run-length coded pairs based on the probabilities with which the codes occur. Short codes are assigned to pairs that appear more frequently and longer codes are assigned to pairs that appear less frequently. The Huffman code is appended with the actual value of the AC coefficient and transmitted.

Therefore, in one embodiment, each image packet that is transmitted may comprise the fixed length DC value field, the variable-length PQR field, and a variable number of AC value fields. The DC value field contains the unsigned DC offset for the pixel block. The PQR field contains PQR information describing if and how the 16×16 pixel block has been subdivided into smaller blocks. This field can be 1, 5, 9, 13, 17 or 21 bits in length. After the PQR, the AC value field contains Huffman coded zero-run-length and size of the AC coefficient values.

Referring back to FIG. 2, the audio portion of the digital information is generally passed to the audio compressor 230 for compression. The audio compressor 230 may also compress the digital audio image information using any number of compression techniques. The compressed digital information is then received and processed by the back-end processor 250. For example, the compressed image and audio information may be encrypted using any one of a number of known encryption techniques. The compressed information may be multiplexed along with synchronization information and packetized. Here, the synchronization information allows the image and audio streamed information to be played back in a time aligned manner at the theater subsystem 104. In another embodiment, the image and audio information may also be treated separately, rather than multiplexed, and separately packetized. The processed image and audio information may be sent to the hub storage medium 130 for storage on a storage medium.

When a program is to be viewed, the program information may be retrieved and transferred to the auditorium module 170 through the theater manager 160. Each auditorium module 170 may process and display a different program from other auditorium modules 170 in the same theater subsystem 104, or one or more auditorium modules 170 may simultaneously process and display the same program.

At the auditorium 170, the compressed information is decrypted, if necessary and decompressed by the decoder 175 using a decompression algorithm that is inverse to the compression algorithm used at the encoder 120. For example, the decompression process may include variable length decoding, inverse quantization, inverse ABSDCT, and deinterleaving to combine the DCT blocks. The decompressed image information is thereafter converted to a standard video format for display (which may be either an analog or digital format) and may be displayed. The audio information is also decompressed and provided for playback with the image information.

Figure 8:
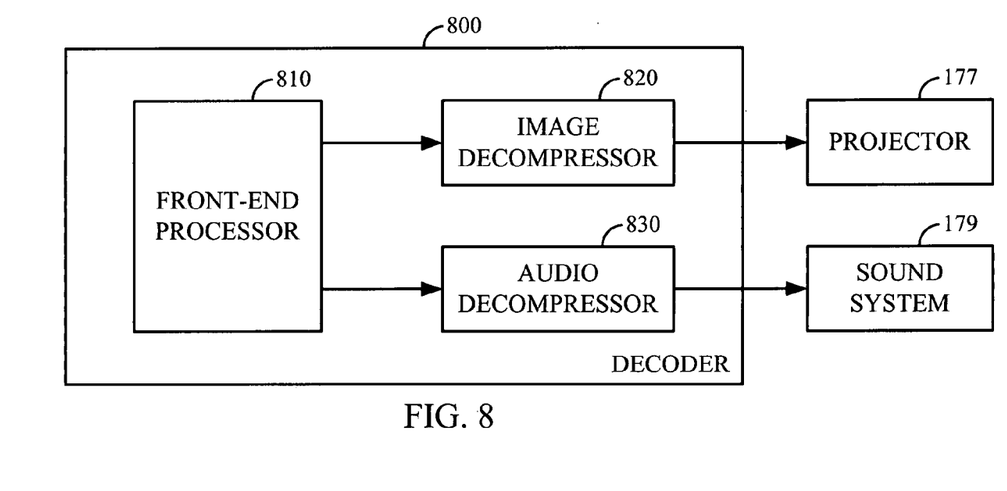
FIG. 8 shows one embodiment of a decoder.

FIG. 8 shows one embodiment of a decoder 800. Generally, the decoder 800 processes the compressed/encrypted information to be visually projected by the projector 177 onto a screen or surface and audibly presented using the sound system 179. The decoder 800 may comprise a front-end (FE) processor 810, an image decompressor 810 and an audio decompressor 820. The decoder 800 may be implemented on one or more circuit card assemblies and the circuit card assemblies may be installed in a self-contained enclosure that mounts on, within or adjacent to the projector 177.

In operation, the FE processor 810 identifies and separates the individual control, image, and audio packets that arrive from the theater manager 160. Control packets may be sent to the theater manager 160 while the image and audio packets are sent to the image and audio decompressors 820 and 830, respectively. Here, if a plurality of index systems is implemented for compression of the image data, the control packets may include information indicating the selected index system. Read and write operations tend to occur in bursts. Therefore, large buffers may be used to stream data smoothly from the decoder 175 directly to the projector 179. In some embodiments, a cryptographic smart card may be implemented for transfer and storage of unit-specific cryptographic keying information.

The image decompressor 820 performs decryption if necessary, decompresses the compressed image packets and reassembles the original image for presentation on the screen. The output of this operation generally provides standard analog RGB signals to the digital cinema projector 177. The decryption and decompression can be performed in real-time, allowing for real-time playback of the programming material.

The processing elements used for decompression may be implemented in dedicated specialized hardware configured for this function such as an ASIC and/or one or more circuit card assemblies. Alternatively, the decompression processing elements may be implemented as standard elements and/or generalized hardware including a variety of digital signal processors, programmable electronic devices and/or computers that operate under the control of special function software and/or firmware programming. Multiple ASICs may be implemented to process the image information in parallel to support high image data rates.

Figure 9:
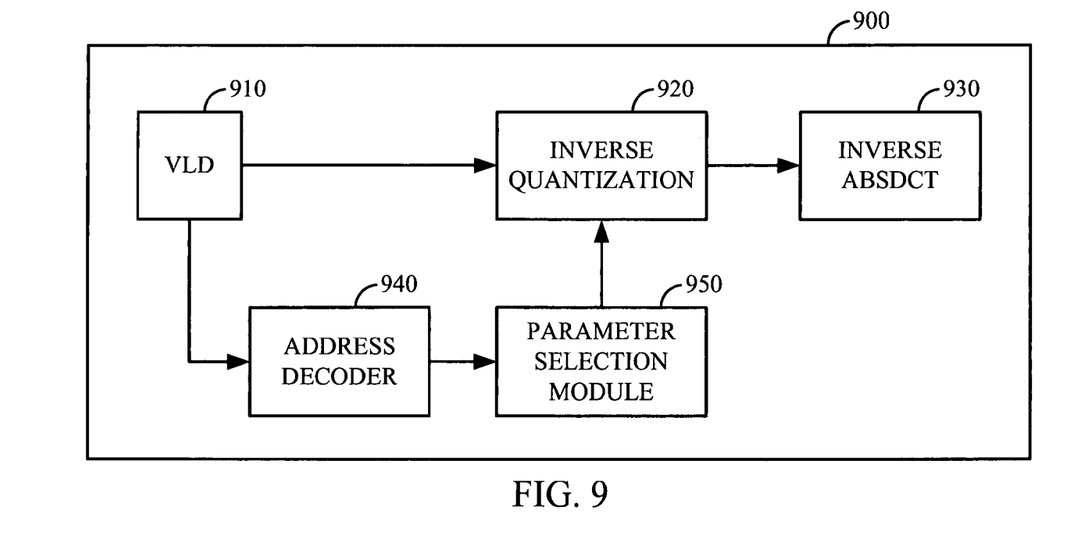
FIG. 9 shows one embodiment of an image decompressor.

At the image decompressor 820, the compressed image data streams undergo an image decompression symmetric to the image compression used in the encoder 120. For example, FIG. 9 shows one embodiment of an image decompression 900 that is symmetric to the image compression 700 shown in FIG. 7. The image decompressor 900 may include a variable length decoding (VLD) module 910 to decompress the compressed image information, an inverse quantization module 920 to inverse quantize the decompressed image information and an inverse ABSDCT module 930 to convert the inverse quantized image information from frequency to spatial domain to enable display of the image. The image decompressor 900 may further comprise an address decoder 940 to decode the pixel locations based on the index system and a parameter selecting module 950 to select the appropriate quantization parameters.

The VLD module 910 variable length decodes the compressed image information to generate variable length decoded data blocks. The inverse quantization module 920 performs inverse quantization. Since the quantization at the image compressor 700 is based on block size assignment information, the inverse quantization at the image decompressor 900 is also based on block size assignment. In particular, the block size assignment and address of the data within the n×n block is used to determine the appropriate Q-step. Moreover, if the quantization at the image compressor 700 was performed using weighting functions, the block size assignment information and data address is used to determine the appropriate FWM table.

Although FIG. 9 shows the address module 940 and parameter selection module 950 as implemented separately from the quantization module 930, either one or both the address module 940 and the parameter selection module 950 may be implemented as a part of the quantization module 930. Alternatively, the address module 940 and the parameter selecting module 950 may be combined and implemented separately from the quantization module 930. Also, either one or both the address module 940 and the parameter selection module 950 may be implemented by software, firmware or a combination of software, firmware and hardware.

Furthermore, the inverse quantization may be implemented by two multipliers. The data position and block size assignment information are first used to select the inverse Q_step value. A first multiplier multiplies the data by the Q_step value. At the same time, the data position and the block size assignment information are also used to select the appropriate FWM table and lookup of the second inverse quantization multiplier. A second multiplier then multiplies the result of the first multiplication by the FWM value.

Figure 10A:
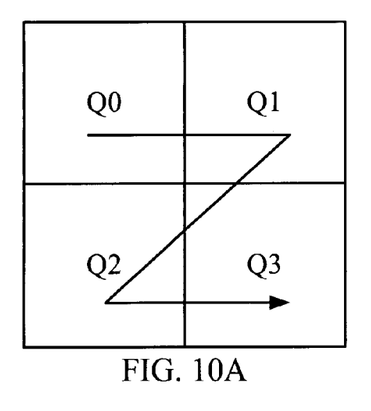
FIGS. 10A and 10B illustrate one embodiment of the block size assignment data ordering.
Figure 10B:
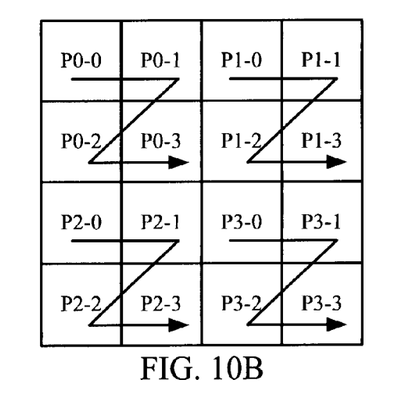
Figure 11A:
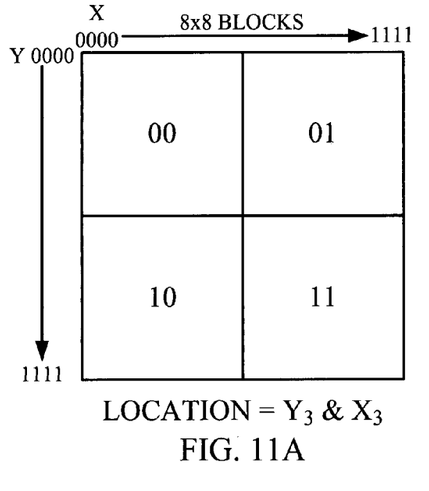
FIGS. 11A and 11B illustrate one embodiment of block selection based on Y and X indices.
Figure 11B:
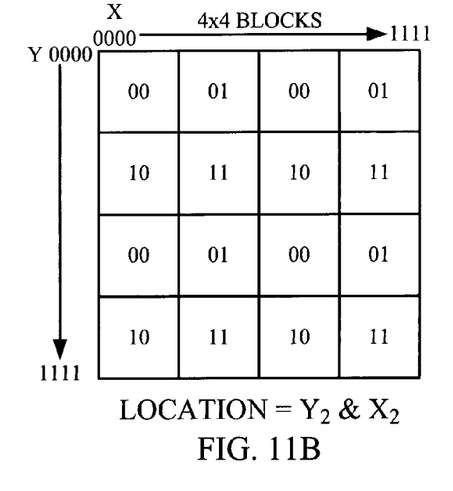

In one embodiment, the address decoder 940 decodes the address of the data based on the Y-X index system as described with reference to FIGS. 6A to 6C. Accordingly, the selection of the quantization parameter(s) is (are) based on the Y-X index system and block size assignment information. For example, for the 16×16 block data, the Y and X indices are used to determine a variable PQR value based on the data location and the variable PQR value is used to select the appropriate Q-step and FWM table. FIGS. 10A and 10B show one embodiment of the ordering of PQR bits Q0 to Q3 and P0 to P3 based on the data location decoded by the address decoder 940, and FIGS. 11A and 11B show one embodiment of the 8×8 and 4×4 block selection based on the Y and X indices.

As shown, Q0 corresponds to $(Y_3, X_3)=(0, 0)$, Q1 corresponds to $(Y_3, X_3)=(0, 1)$, Q2 corresponds to $(Y_3, X_3)=(1, 0)$ and Q3 corresponds to $(Y_3, X_3)=(1, 1)$. P0-0, P0-1, P0-2 and P0-3 correspond to $(Y_2, X_2)=(0, 0), (0, 1), (1, 0)$ and $(1, 1)$ respectively for $(Y_3, X_3)=(0, 0)$. Similarly, P1-0, P1-1, P1-2 and P1-3 correspond to $(Y_2, X_2)=(0, 0), (0, 1), (1, 0)$ and $(1,$ 1) respectively for $(Y_3, X_3)=(0, 1)$; P2 P2-2 and P2-3 correspond to $(Y_2, X_2)=(0, 0), (0, 1), (1, 0)$ and $(1, 1)$ respectively for $(Y_3, X_3)=(1, 0)$; and P3-0, P3-1, P3-2 and P3-3 correspond to $(Y_2, X_2)=(0, 0), (0, 1), (1, 0)$ and $(1, 1)$ respectively for $(Y_3, X_3)=(1, 1)$.

Based on the Y-X index system, the address decoder 940 determines the Y-X indices for each of the pixel position of the 16×16 block data. The parameter selecting module 950 receives the Y-X indices from the address decoder and also receives the PQR information for the 16×16 block. Using the Y-X indices and the PQR information, the parameter selecting module 950 determines the PQR value and selects the appropriate Q-step and FWM table. The quantization module 930 can then quantize the decompressed image data using the selected Q-step and frequency weight values.

Figure 12:
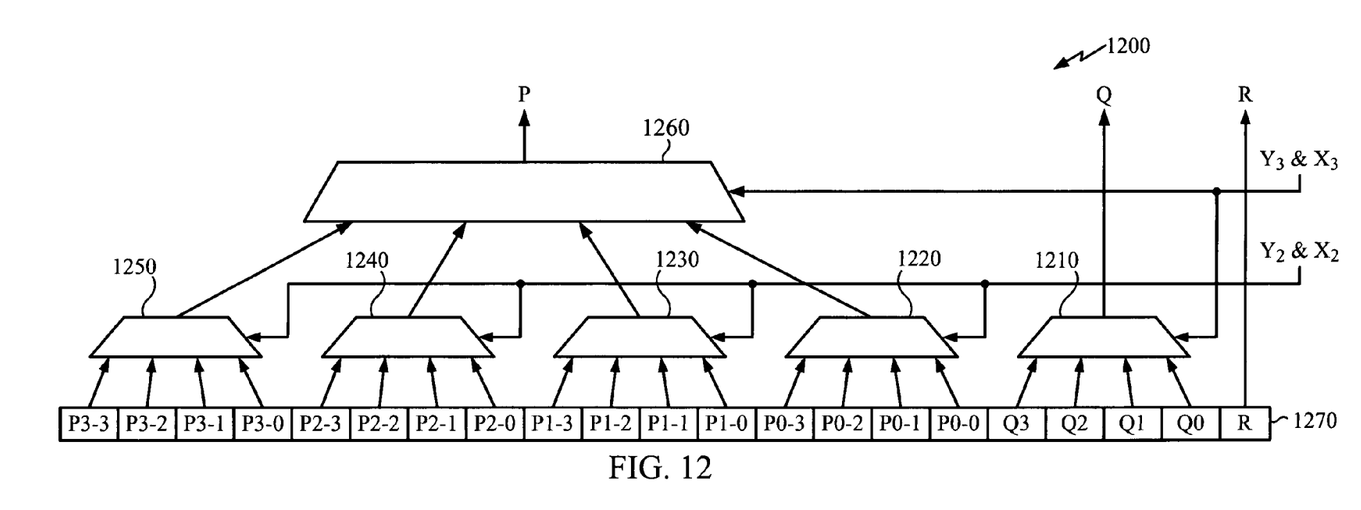
FIGS. 12 and 13 show different embodiments of a parameter selection module.
Figure 13:
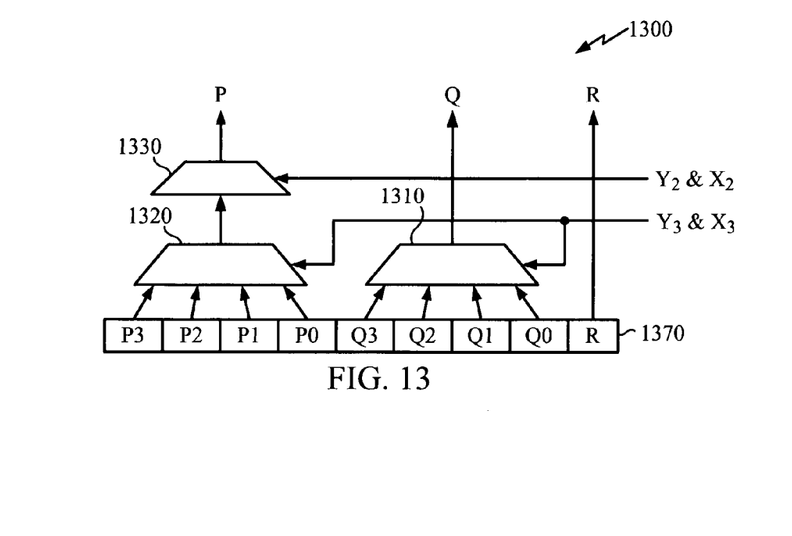

FIG. 12 shows one embodiment of a parameter selection module 1200 comprising multiplexers (MUXs) 1210~1260 and an array 1270. FIG. 13 shows another embodiment of a parameter selection module 1300 comprising multiplexers (MUXs) 1310~1330 and an array 1370. In the parameter selection module 1200 and 1300, the array 1270 and array 1370, each comprises fields that represent Q0 to Q3 bits and P0 to P3 bits for each Q0 to Q3 bits. In one embodiment, the values of the arrays 1270 and 1370 are initially set to a default value, for example zero. Once the PQR information is received, the parameter selection modules 1200 and 1300 store the PQR information in the corresponding fields. Also, the first value or R value of the variable PQR value is the R bit from the PQR information. Moreover, the MUX 1210 and MUX 1310, respectively, select a second value or Q value of the variable PQR value based on the $Y_3$ and $X_3$ indices.

In parameter selection module 1200, the MUXs 1220 to 1250 each select a P bit based on the $Y_2$ and $X_2$ indices. The third value or P value of the variable PQR value is then selected by MUX 1260 based on the $Y_3$ and $X_3$ indices. Alternatively, in parameter selection module 1300, a set of P bits corresponding to one of P0, P1, P2 or P3 are selected by MUX 1320 based on $Y_3$ and $X_3$ indices. The third value or P value is then selected by MUX 1330 based on the $Y_2$ and $X_2$ indices.

Figure 14:
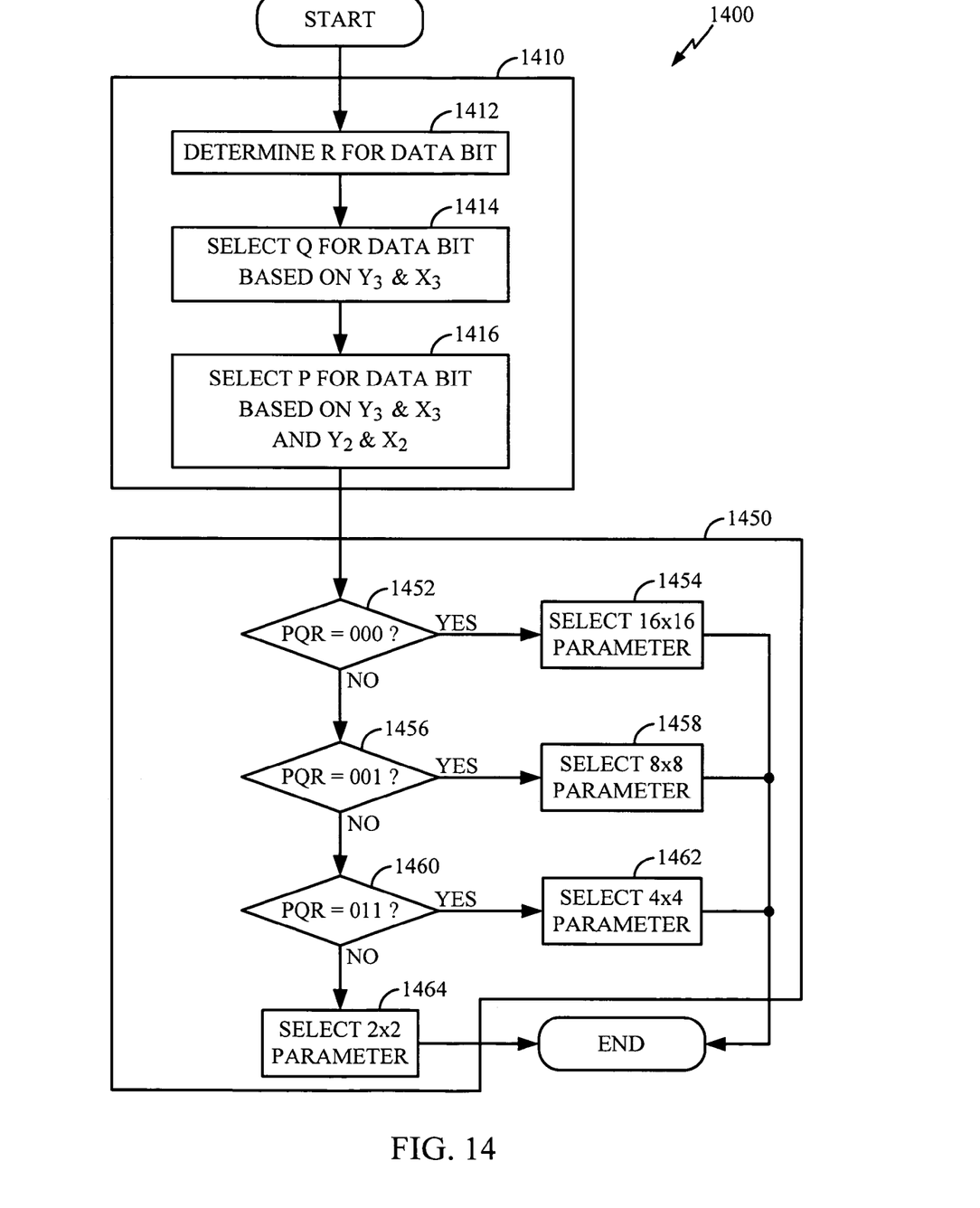
FIGS. 14 to 16 show different embodiments of a method for selecting the appropriate parameter.

FIG. 14 shows one embodiment of a method 1400 for selecting the appropriate quantization parameter for a data bit of a 16×16 block of data. Method 1400 comprises determining a variable PQR value based on the Y-X indices (1410) and selecting the quantization parameter based on the variable PQR value (1450). The R value is selected directly from the first bit or R bit of the PQR information (1412). The Q value is selected by MUX 1210 based on $Y_3$ and $X_3$ indices (1414). For example, if $(Y_3, X_3)=(0, 1)$, the value from the Q1 field is selected. The P value is then selected based on both $Y_3, X_3$ and $Y_2, X_2$ indices (1416).

In one embodiment, MUXs 1220 to 1250 each selects a value from a P field based on $Y_2$ and $X_2$ indices. For example, if $(Y_2, X_2)=(1, 1)$, MUXs 1220 to 1250 would each select the value from P0-3, P1-3, P2-3 and P3-3 fields, respectively. The P value is then selected by MUX 1260 from one of the MUXx 1220 to 1250 based on the $Y_3$ and $X_3$ indices. For example, for $(Y_3, X_3)=(0, 1)$, P1-3 from MUX 1230 is selected. In a second embodiment, a set of P values are selected by the MUX 1320 based on $Y_3$ and $X_3$ indices. For example, if $(Y_3, X_3)=(0, 1)$, P values corresponding to P1 are selected and the values from P1-0, P1-1, P1-2 and P1-3 fields would be output. The P value is then selected by MUX 1330 from one of the P fields based on the $Y_2$ and $X_2$ indices. For example, for $(Y_2, X_2)=(1, 1)$, the value from P1-3 field is selected.

Thereafter, the selection of the appropriate FWM table and Q-step can be implemented as follows. If PQR=000, a 16×16 parameter is selected (1452 and 1454). If PQR=001, an 8×8 parameter is selected (1456 and 1458). If PQR=011, a 4×4 parameter is selected (1460 and 1462). Otherwise, a 2×2 parameter is selected (1464).

Figure 15:
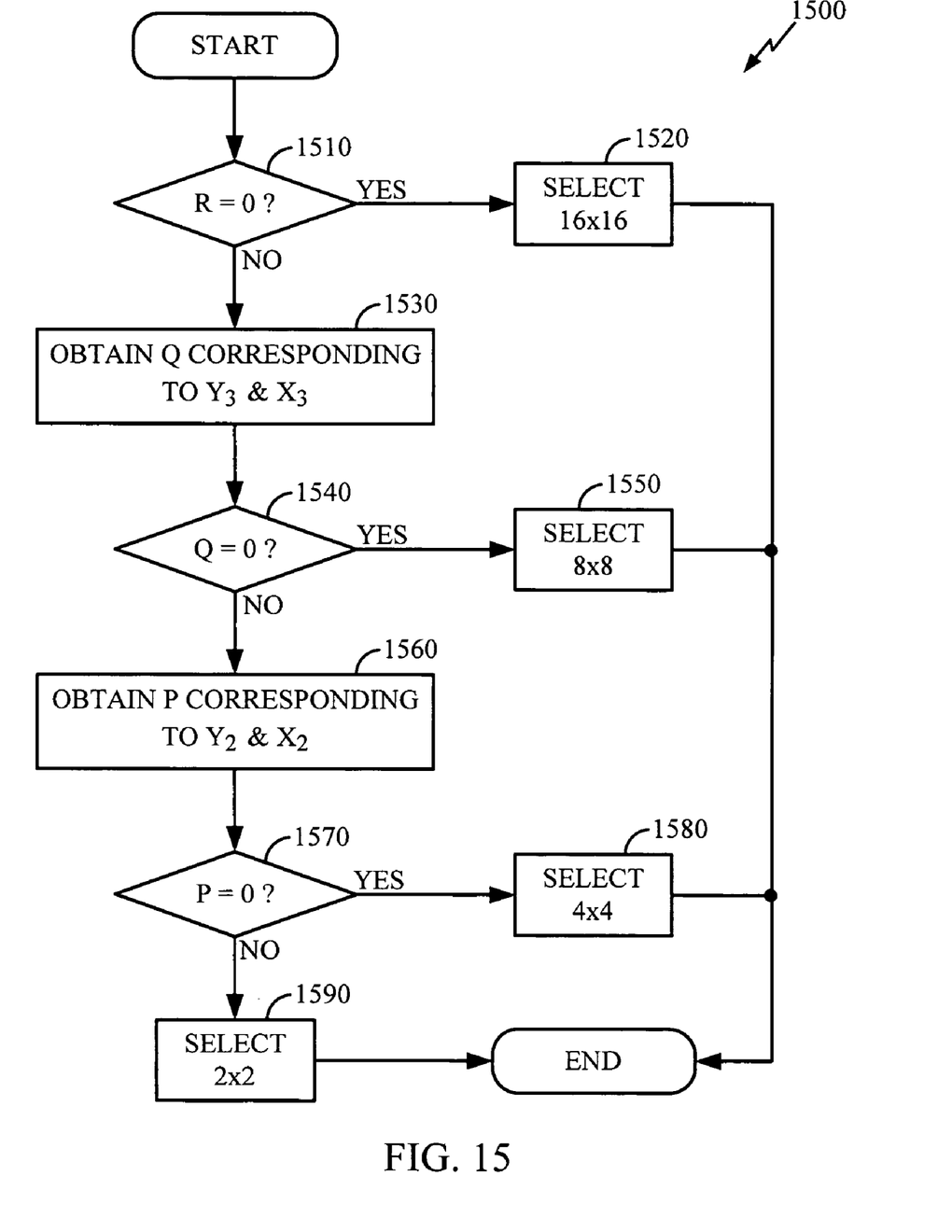

FIG. 15 shows another embodiment of a method 1500 for selecting the appropriate quantization parameter for a 16×16 block of data. Here the quantization parameter may be the Q_step or both the Q_step and the FWM table as described above. For each pixel data of the 16×16 block, a determination is made whether or not the R=0 (1510). If the value of R=0, then 16×16 FWM table and Q_step are selected (1520). If the value of R≠0, the Q bit corresponding to $Y_3$ and $X_3$ is obtained (block 1530) and a determination is made whether the obtained value of Q=0 (1540). If the value of Q=0, then 8×8 FWM table and Q_step are selected (1550). If the value of Q≠0, the P bit corresponding to $Y_2$ and $X_2$ for the quadrant corresponding to $Y_3$ and $X_3$ is obtained (1560) and a determination is made whether the obtained value of P=0 (1570). If the value of P=0, then 4×4 FWM table and Q_step are selected (1580). Otherwise, the 2×2 FWM table and Q_step are selected (1590).

Figure 16:
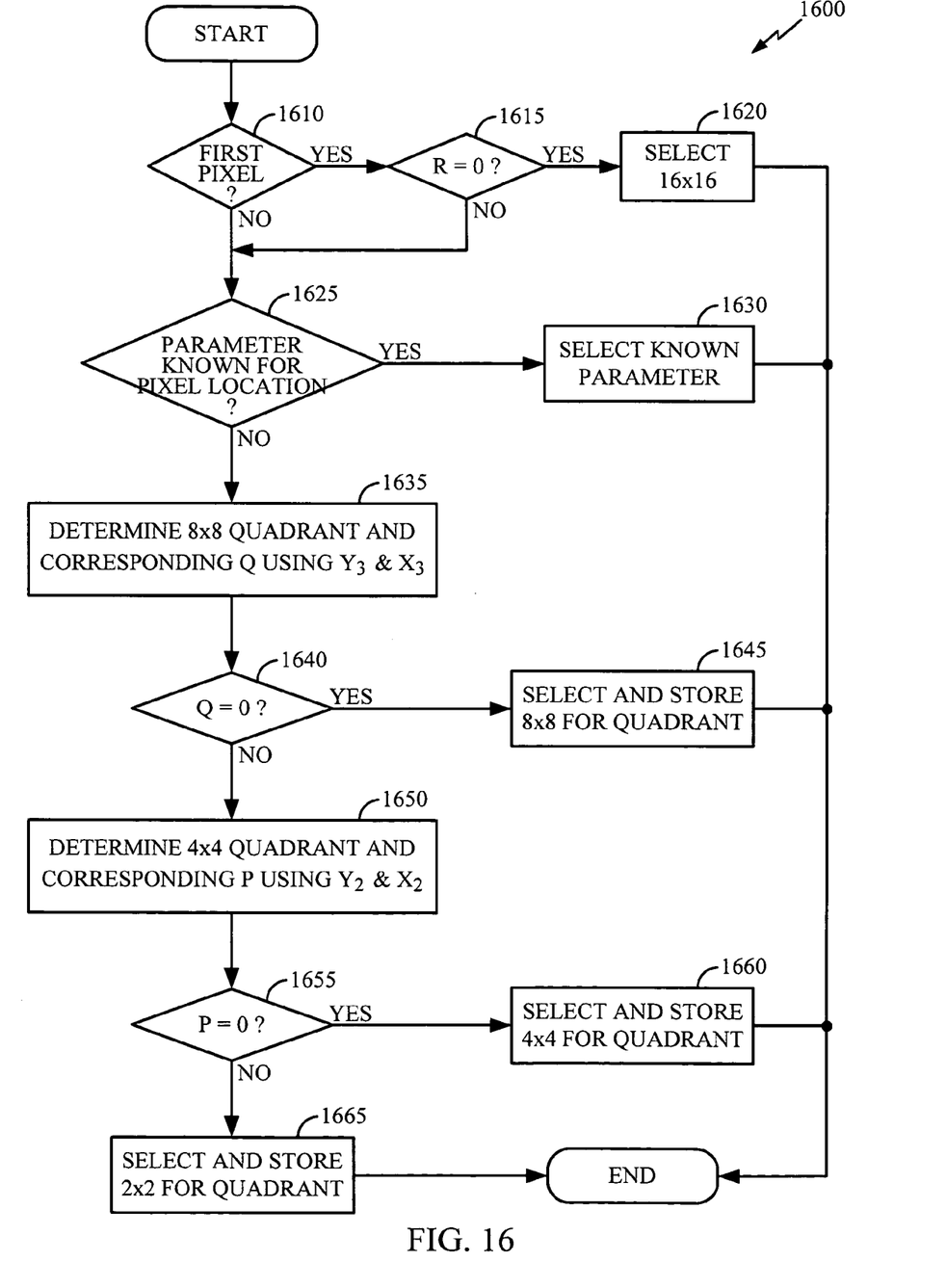

Alternatively, FIG. 16 shows another embodiment of a method 1600 for selecting the appropriate quantization parameter for a 16×16 block data. As in method 1500, the quantization parameter may be the Q_step or both the Q_step and the FWM table. Also, in this embodiment, a storage medium is used to store the FWM table and/or Q_step values as determined for quadrants or sub-blocks. First, a determination is made whether the data is the first pixel data of the image block (block 1610). If the data is the first pixel data, a determination is made whether R=0 (block 1615). If R=0, then 16×16 FWM table and Q_step are selected and stored in the storage medium for use in the remaining data of the 16×16 block (block 1620). If the data is not the first pixel data or if R≠0, a determination is made whether the parameter is known for the pixel position of the data (block 1625). If known, the known parameter is selected (block 1630). Here, the storage medium is checked to determine if a parameter selection has been stored for the corresponding pixel position. In one embodiment, the storage medium may be a lookup table.

If the parameter is not known, the 8×8 quadrant or sub-block in which the pixel position of the data is located is determined using the $Y_3$ and $X_3$ indices (block 1635). If the corresponding Q=0, 8×8 FWM table and Q_step are selected, and stored for the remaining data in the corresponding 8×8 quadrant (blocks 1640 and 1645). If Q≠0, the 4×4 quadrant or sub-block in which the pixel position of the data is located is determined using the $Y_2, X_2$ and $Y_3, X_3$ indices (block 1650). If the corresponding P=0, 4×4 FWM table and Q_step are selected and stored for the remaining data in the corresponding 4×4 quadrant (blocks 1655 and 1660). If P≠0, 2×2 FWM table and Q_step are selected and stored for the data in the corresponding 2×2 quadrants or sub-blocks of the 4×4 quadrant (block 1665).

Therefore, the appropriate quantization parameters can be selected based on pixel positions of data and block size assignment. Accordingly, the image decompressor 900 variable length decodes and inverse quantizes the compressed data using the appropriate quantization parameters. After inverse quantization, an inverse ABSDCT is performed to recover the original image information.

The decompressed image data goes through digital to analog conversion, and the analog signals are output to projector 177. Alternatively, a digital interface may be used to convey the decompressed digital image data to the projector 177 obviating the need for the digital-to-analog process. The audio decompressor 830 performs decryption, if necessary, and reassembles the original audio for presentation on a theater's speakers or audio sound module 179. The output of this operation can provide standard line level audio signals to the sound module 179. Similar to the image decompressor 820, audio decompression is performed with an algorithm symmetric to that used at the central hub 102 for audio compression. As discussed earlier, audio and data tracks may be time synchronized to the image programs or may be presented asynchronously without direct time synchronization.

It should be noted that the foregoing embodiments are merely exemplary and are not to be construed as limiting the invention. For example, the invention may be implemented by hardware, software, firmware, or any combination thereof. When implemented in software or firmware, the elements of the invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The program code or code segments may be stored in a machine readable medium, such as a processor readable medium or a computer program product, or transmitted by a computer data signal embodied in a carrier wave or a signal modulated by a carrier over a transmission medium or communication link. The machine readable medium or processor readable medium may include any medium that can store or transfer information in a form readable and executable by a machine (e.g. a processor, a computer, etc.). Examples of the machine/processor-readable medium include an electronic circuit, a semiconductor memory device, a read only memory (ROM), a flash memory, an erasable programmable ROM (EPROM), a floppy diskette, a compact disk CD-ROM, and optical disk, a hard disk, a fiber optic medium, a radio frequency (RF) link. The computer data signal may include various signal that can propagate over a transmission medium such as electronic network channels, optical fibers, air, electromagnetic, RF links, etc. The code segments may be downloaded via networks such as the Internet, an Intranet, etc.

In addition, the playback module 173 and the decoder 175 may be integrated into a single playback-decoder module. The encoding may include other processes such as differential quad-tree transformation. In such case, the decoding would include inverse differential quad-tree transformation. Also, a bit value of 1 rather than 0 may be used to indicate that a block is subdivided in the PQR information. Similarly, the bit values of X and Y indices may be inversed. Furthermore, although the invention has been described with reference to an n×n data block, the invention is applicable to an n×m block where n≠m. Moreover, the invention is applicable for the selection of parameters other than quantization parameters if the parameter depends on data block size where there are different data block sizes.

Therefore, the description of the invention is intended to be illustrative, and not to limit the scope of the claims. As such, the present teachings can be readily applied to other types of apparatus and many alternatives, modifications, and variations will be apparent to those skilled in the art.

What is claimed is:

1. A method comprising:
    decoding an address of data within a variable length decoded data block into Y and X indices based on a Y and X index system;
    selecting a quantization parameter based at least on block size assignment information and the decoded address of the data within the variable length decoded data block; and
    inverse quantizing the variable length decoded data block using the selected quantization parameter.

2. The method of claim 1, wherein the variable length decoded data block of a size such that it can be divided into subblocks, which can be further divided into sub-subblocks, which can be further divided into sub-sub-subblocks, and wherein the block size assignment information comprises:
    a first bit indicating whether the variable length decoded data block is divided into one or more subblocks;
    second bits if the first bit indicates that the variable length decoded data block is divided into the one or more subblocks, each second bit indicating whether a corresponding subblock is divided into one or more sub-subblocks; and
    third bits if at least one second bit indicates that the corresponding one or more subblocks is divided into one or more sub-subblocks; each third bit indicating whether a corresponding sub-subblock is divided into one or more sub-sub-subblocks.

3. The method of claim 2, wherein selecting the quantization parameter comprises:
    determining a variable value based at least on the block size assignment information and the Y and X indices; and
    selecting the quantization parameter based at least on the determined variable value.

4. The method of claim 3, wherein determining the variable value comprises:
    determining a first value of the variable value as the first bit of the block size assignment information;
    selecting one of the second bits of the block size assignment information as a second value of the variable value based on the Y and X indices, if the block size assignment information comprises second bits, and otherwise selecting a default value as the second value of the variable value; and
    selecting one of the third bits of the block size assignment information as a third value of the variable value based on the Y and X indices, if the block size assignment information comprises third bits, and otherwise selecting a default value as the third value of the variable value.

5. Apparatus comprising:
    means for decoding an address of data within a variable length decoded data block into Y and X indices based on a Y and X index system;
    means for selecting a quantization parameter based at least on block size assignment information and the decoded address of the data within the variable length decoded data block; and
    means for inverse quantizing the variable length decoded data block using the selected quantization parameter.

6. The apparatus of claim 5, wherein the variable length decoded data block is of a size such that it can be divided into subblocks, which can be further divided into sub-subblocks, which can be further divided into sub-sub-subblocks, and wherein the block size assignment information comprises:
    a first bit indicating whether the variable length decoded data block is divided into one or more subblocks;

second bits if the first bit indicates that the variable length decoded data block is divided into the one or more subblocks, each second bit indicating whether a corresponding subblock is divided into one or more sub-subblocks; and third bits if at least one second bit indicates that the corresponding one or more subblocks is divided into one or more sub-subblocks; each third bit indicating whether a corresponding sub-subblock is divided into one or more sub-sub-subblocks.

7. The apparatus of claim 6, wherein the means for selecting the quantization parameter comprises:

means for determining a variable value based at least on the block size assignment information and the Y and X indices; and means for selecting the quantization parameter based at least on the determined variable value.

8. The apparatus of claim 7, wherein the means for determining the variable value comprises:

means for determining a first value of the variable value as the first bit of the block size assignment information;

means for selecting one of the second bits of the block size assignment information as a second value of the variable value based on the Y and X indices, if the block size assignment information comprises second bits, and otherwise selecting a default value as the second value of the variable value; and means for selecting one of the third bits of the block size assignment information as a third value of the variable value based on the Y and X indices, if the block size assignment information comprises third bits, and otherwise selecting a default value as the third value of the variable value.

9. A computer-readable medium encoded with a computer program, the computer program embodying executable instructions, the executable instructions comprising:

instructions to decode an address of data within a variable length decoded data block into Y and X indices based on a Y and X index system;

instructions to select a quantization parameter based at least on block size assignment information and the decoded address of the data within the variable length decoded data block;

instructions to inverse quantize the variable length decoded data block using the selected quantization parameter.

10. The computer-readable medium of claim 9, wherein the variable length decoded data block is of a size such that it can be divided into subblocks, which can be further divided into sub-subblocks, which can be further divided into sub-sub-subblocks, and wherein the block size assignment information comprises:

a first bit indicating whether the variable length decoded data block is divided into one or more subblocks;

second bits if the first bit indicates that the variable length decoded data block is divided into the one or more subblocks, each second bit indicating whether a corresponding subblock is divided into one or more sub-subblocks; and third bits if at least one second bit indicates that the corresponding one or more subblocks is divided into one or more sub-subblocks; each third bit indicating whether a corresponding sub-subblock is divided into one or more sub-sub-subblocks.

11. The computer-readable medium of claim 10, wherein the instructions to select the quantization parameter comprise:

instructions to determine a variable value based at least on the block size assignment information and the Y and X indices; and instructions to select the quantization parameter based at least on the determined variable value.

12. The computer-readable medium of claim 11, wherein the instructions to determine the variable value comprise:

instructions to determine a first value of the variable value as the first bit of the block size assignment information;

instructions to select one of the second bits of the block size assignment information as a second value of the variable value based on the Y and X indices, if the block size assignment information comprises second bits, and otherwise selecting a default value as the second value of the variable value; and instructions to select one of the third bits of the block size assignment information as a third value of the variable value based on the Y and X indices, if the block size assignment information comprises third bits, and otherwise selecting a default value as the third value of the variable value.

* * * * *